(12) United States Patent
Sheldon et al.

(10) Patent No.: US 10,190,942 B2
(45) Date of Patent: Jan. 29, 2019

(54) DIAGNOSIS OF DRIVE SHAFT DISC COUPLINGS

(71) Applicant: SIKORSKY AIRCRAFT CORPORATION, Stratford, CT (US)

(72) Inventors: Jeremy Sheldon, Henrietta, NY (US); Matthew James Watson, Butler, PA (US); David Kasper, Shelton, CT (US); Avinash Sarlashkar, Pittsford, NY (US); Jeffrey Steele, Pittsford, NY (US); Mark W. Davis, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/316,017

(22) PCT Filed: Mar. 31, 2015

(86) PCT No.: PCT/US2015/023526
§ 371 (c)(1),
(2) Date: Dec. 2, 2016

(87) PCT Pub. No.: WO2015/187241
PCT Pub. Date: Dec. 10, 2015

(65) Prior Publication Data
US 2017/0089805 A1    Mar. 30, 2017

Related U.S. Application Data

(60) Provisional application No. 62/006,473, filed on Jun. 2, 2014.

(51) Int. Cl.
*G01M 13/02* (2006.01)
*G01M 17/00* (2006.01)

(52) U.S. Cl.
CPC .......... *G01M 13/028* (2013.01); *G01M 13/02* (2013.01); *G01M 17/00* (2013.01)

(58) Field of Classification Search
CPC ..... G01M 13/028; G01M 13/02; G01M 17/00
See application file for complete search history.

(56) References Cited

U.S. PATENT DOCUMENTS

| | | | |
|---|---|---|---|
| 5,142,916 A | | 9/1992 | Yamaguchi |
| 5,381,692 A | * | 1/1995 | Winslow ............. G01M 13/045 340/682 |

(Continued)

FOREIGN PATENT DOCUMENTS

| | | |
|---|---|---|
| EP | 0889315 A2 | 1/1999 |
| EP | 2345894 A2 | 7/2011 |
| EP | 2431720 A1 | 3/2012 |

OTHER PUBLICATIONS

Notification of Transmittal of the International Search Report for International Appln. No. PCT/US2016/23526; International Filing Date: Mar. 31, 2015; dated Aug. 12, 2015; 9 pages.

(Continued)

*Primary Examiner* — Freddie Kirkland, III
(74) *Attorney, Agent, or Firm* — Cantor Colburn LLP

(57) ABSTRACT

Embodiments are directed to obtaining data based on samples of a vibration signal, processing, by at least one processor, the data to obtain a qualitative and quantitative assessment of a health of the one or more components based on an application of the data to at least one model, and outputting the assessment. Embodiments of the disclosure may be applied to one or more components of a drive shaft of an aircraft.

13 Claims, 4 Drawing Sheets

(56) References Cited

U.S. PATENT DOCUMENTS

| | | |
|---|---|---|
| 7,400,943 B2 | 7/2008 | Vian et al. |
| 8,356,207 B2 | 1/2013 | Hosek et al. |
| 8,442,778 B2 | 5/2013 | Bechhoefer et al. |
| 9,218,693 B2 * | 12/2015 | Hale .................... G07C 5/0825 |
| 9,240,083 B2 * | 1/2016 | Isom .................... G07C 5/0816 |
| 2009/0216398 A1 | 8/2009 | Lynch |
| 2010/0219987 A1 | 9/2010 | Isom et al. |
| 2011/0285527 A1 | 11/2011 | Arms et al. |
| 2013/0184959 A1 | 7/2013 | Wndelsdorf et al. |

OTHER PUBLICATIONS

Written Opinion of the International Searching Authority for International Appln. No. PCT/US2015/23526; Filing Date: Mar. 31, 2016; dated Aug. 12, 2015; 4 pages.

EP Communication; Extended European Search Report; Application No. 15803192.2-1001 /3149443 PCT/US2015023526; dated Jan. 24, 2018; pp. 1-10.

PCT International Preliminary Report on Patentability; International Application No. PCT/US2015/023526, International Filing Date: Mar. 31, 2015; dated Dec. 6, 2016; pp. 1-5.

* cited by examiner

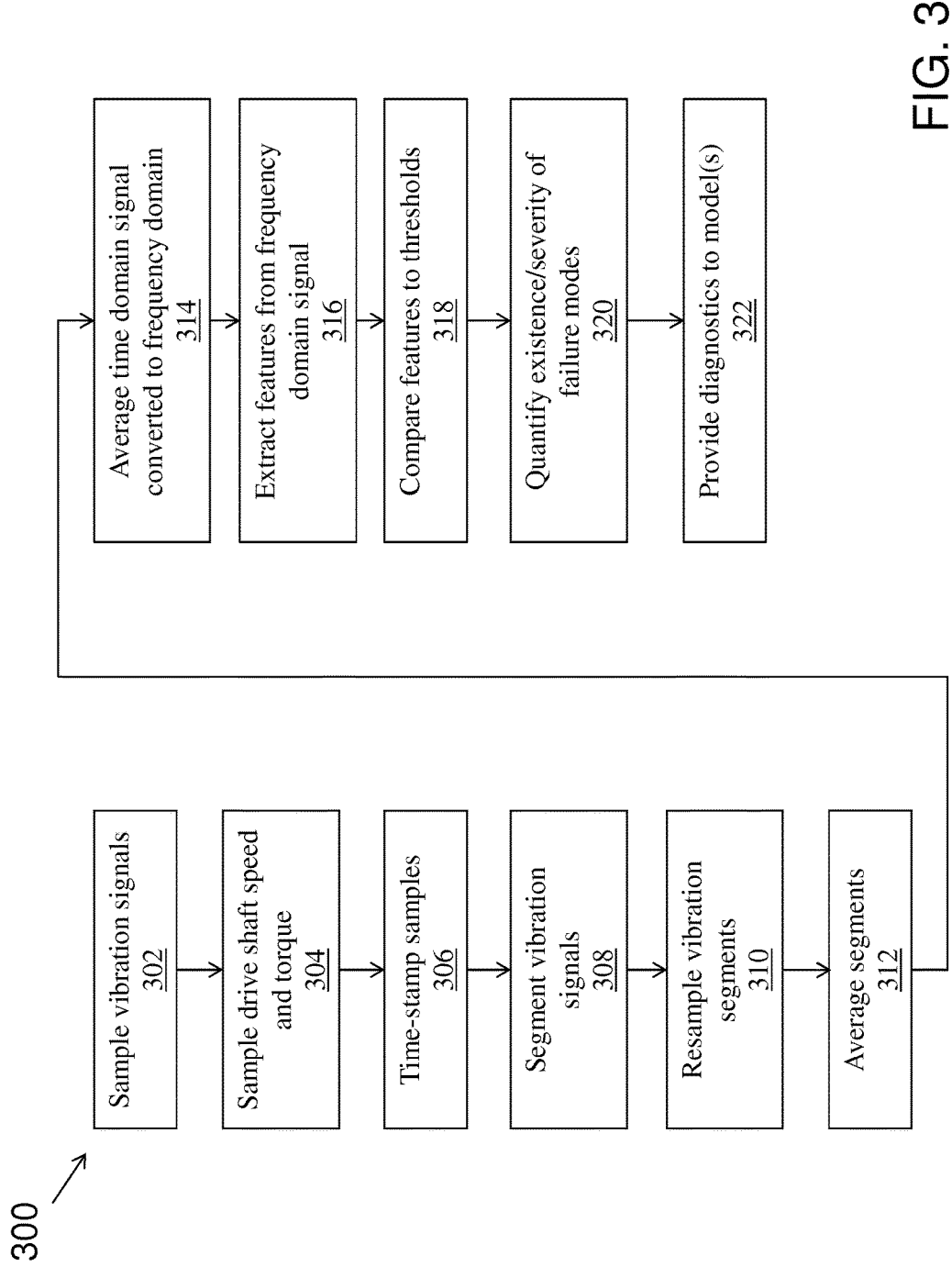

DIAGNOSIS OF DRIVE SHAFT DISC COUPLINGS

CROSS REFERENCE TO RELATED APPLICATIONS

This application is a National Stage application of PCT/US2015/023526, filed Mar. 31, 2015, which claims the benefit of U.S. Provisional Application No. 62/006,473, filed Jun. 2, 2014, both of which are incorporated by reference in their entirety herein.

STATEMENT REGARDING FEDERALLY SPONSORED RESEARCH OR DEVELOPMENT

This invention was made with Government support with the United States Army under Contract No. W911W6-10-2-0006. The Government has certain rights in this invention.

BACKGROUND

On an aircraft, such as a rotorcraft (e.g., a helicopter), conducting an inspection or maintenance activity with respect to a drive shaft is laborious and time consuming. For example, various visual inspections are required at fixed intervals, often requiring a complete removal of the drive shafts and couplings. After removal, frequent bolt-nut torque checks must be performed. Considering that this process must be performed for each of the drive shaft sections in the aircraft, the maintenance burden is substantial. However, experience indicates that a majority of these inspections do not uncover any problems, resulting in tremendous inefficiencies.

Mechanical failure modes typically looked for or examined during these inspections include cracking of a disc coupling, buckling of the disc coupling, bolt-hole elongation (e.g., elongation in flanges), corrosion, damage, security, wear, lamination spread, and loss of bolt preload. It is difficult to detect and quantify the severity (e.g., in terms of likelihood of losing complete torque carrying capacity) of each of these failure modes.

BRIEF SUMMARY

An embodiment is directed to a method applied to one or more components of a drive shaft of an aircraft, the method comprising: obtaining data based on samples of a vibration signal, processing, by at least one processor, the data to obtain a qualitative and quantitative assessment of a health of the one or more components based on an application of the data to at least one model, and outputting the assessment.

An embodiment is directed to an apparatus for use in connection with an aircraft, the apparatus comprising: at least one processor, and memory having instructions stored thereon that, when executed by the at least one processor, cause the apparatus to: obtain data based on samples of a vibration signal, process the data to obtain a qualitative and quantitative assessment of a health of one or more components of a drive shaft of the aircraft based on an application of the data to at least one model, and output the assessment.

An embodiment is directed to an aircraft comprising: a drive shaft comprising a plurality of components, a plurality of sensors configured to measure vibration associated with the aircraft, a control computer configured to: sample measurements from the sensors to obtain data, process the data to obtain a qualitative and quantitative assessment of a health of at least one of the components based on an application of the data to at least one model, and output the assessment.

Additional embodiments are described below.

BRIEF DESCRIPTION OF THE DRAWINGS

The present disclosure is illustrated by way of example and not limited in the accompanying figures in which like reference numerals indicate similar elements.

FIG. 3 illustrates a flow chart of an exemplary method.

DETAILED DESCRIPTION

Figure 1A:
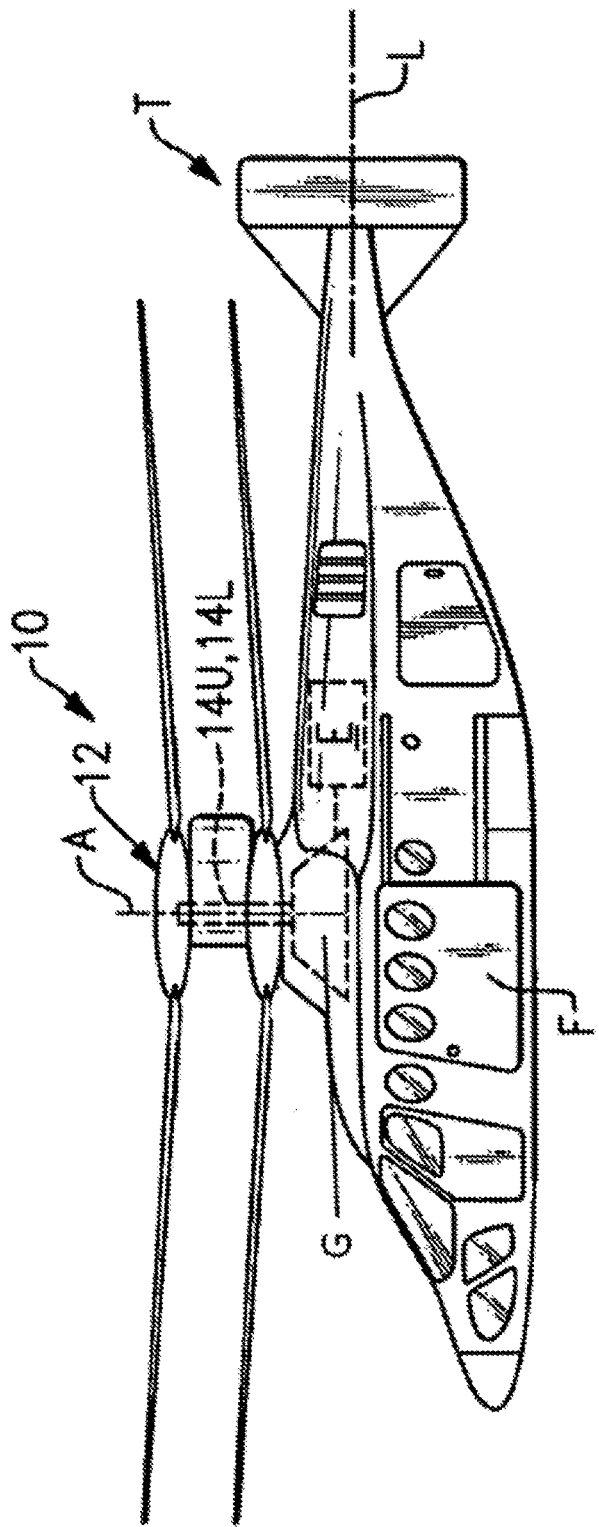
FIG. 1A is a general perspective side view of an exemplary rotary wing aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a general connection between entities may refer to either a direct or an indirect connection.

Exemplary embodiments of apparatuses, systems, and methods are described for predicting the likelihood of failure modes (e.g., cracking of a disc coupling, disc buckling, bolt-hole elongation (e.g., elongation in flanges), corrosion, damage, security, wear, lamination spread, and loss of bolt preload) in disc-style couplings commonly used in transmission or drive shaft systems. In some embodiments, vibration analyses and physics-based models may be used to predict the likelihood of the failure modes. Vibration analysis may be used to quantify levels of misalignment, unbalance, and bolt preload loss that exist via calculation of various shaft order features. These predictions may be fed into failure mode specific models, along with torque load measurements, if available. Physics-based models for disc couplings provide quantitative information that assist in interpretation of vibration data for drive shafts as well as provide quantitative information relative to the effect of operating conditions/history on the drivers that influence disc couplings. Vibration-based diagnostics may provide a condition monitoring capability for detecting various failure mode precursors and drivers, thereby providing a level of "fail safe" detection.

As described above, coupling inspections (e.g., tail drive shaft (TDS)) are a leading contributor to helicopter drive system maintenance. Reducing the maintenance burden of TDS disc couplings, and in general other disc couplings, may therefore be desirable and may reduce: (1) a maintenance labor/flight hour ratio, and (2) the introduction of other maintenance-induced problems.

One approach to reduce the maintenance burden associated with disc coupling inspections is to extend the inspection interval based on the details of actual usage of a particular aircraft or system. With this in mind, embodiments of this disclosure use load information, vibration analysis, and physics-based models to predict the likelihood of various mechanical failure modes commonly looked for during inspections. Enhanced vibration analysis may be used to quantify the levels of misalignment, unbalance, and bolt pre-load loss that exist. These levels may serve as inputs to models, along with the available drive shaft load measurements or predictions.

Embodiments of the disclosure use physics-based models for the disc coupling assemblies to provide quantitative information that assist in the enhanced interpretation of the vibration data for the drive shaft as well as provide quantitative information relative to the effect of operating conditions/history on the drivers that are believed to influence bolt-hole elongation for the shaft coupling assemblies. Quantitative information may be provided to assist in the potential extension of the inspection interval for the disc couplings with minimal impact on operational risk. In general, the technology can be used to diagnose the health of drive shaft couplings other than just helicopter drive shafts.

FIG. 1A illustrates an exemplary rotary wing aircraft 10. The aircraft 10 is shown as having a dual, counter-rotating main rotor system 12, which rotates about a rotating main rotor shaft 14U, and a counter-rotating main rotor shaft 14L, both about an axis of rotation A. Other types of configurations may be used in some embodiments, such as a single rotor system 12.

The aircraft 10 includes an airframe F which supports the main rotor system 12 as well as an optional translational thrust system T which provides translational thrust during high speed forward flight, generally parallel to an aircraft longitudinal axis L.

A main gearbox G located above the aircraft cabin drives the rotor system 12. The translational thrust system T may be driven by the same main gearbox G which drives the rotor system 12. The main gearbox G is driven by one or more engines E. As shown, the main gearbox G may be interposed between the engines E, the rotor system 12, and the translational thrust system T.

Although a particular counter-rotating, coaxial rotor system aircraft configuration is illustrated in the embodiment of FIG. 1A, other rotor systems and other aircraft types such as tilt-wing and tilt-rotor aircrafts may benefit from the present disclosure.

Figure 1B:
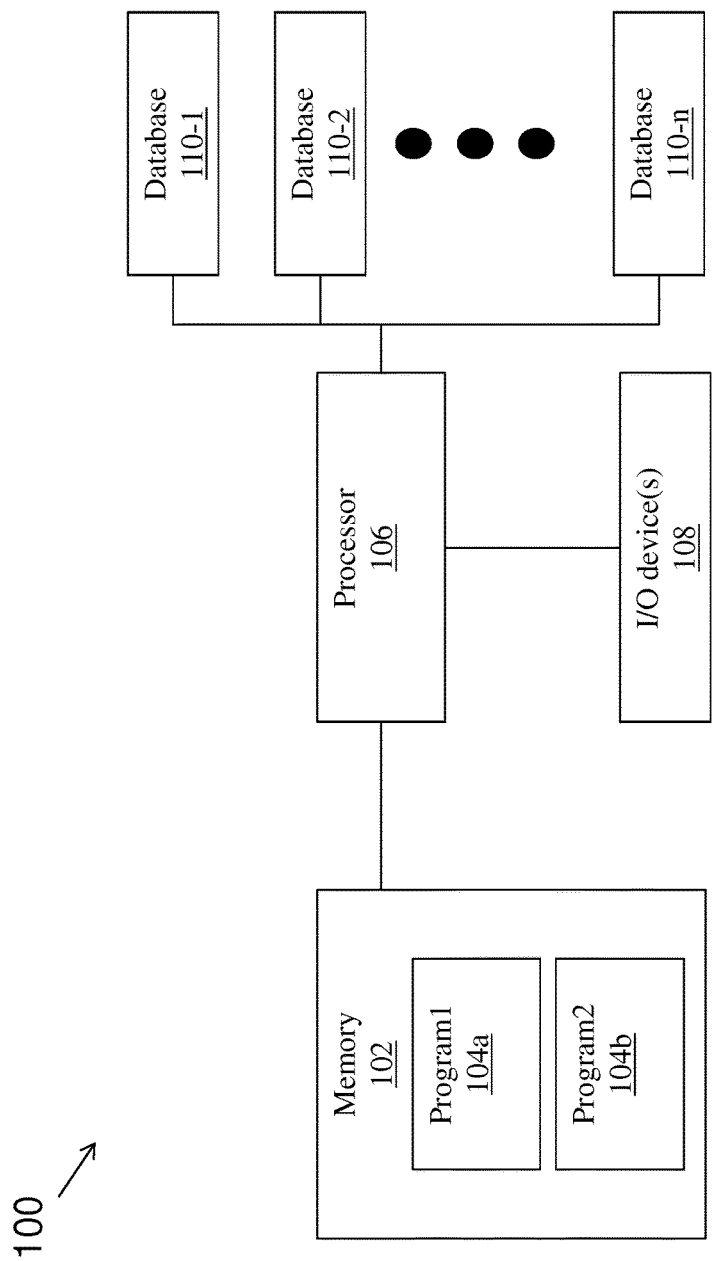
FIG. 1B is a schematic block diagram illustrating an exemplary computing system.

Referring to FIG. 1B, an exemplary computing system 100 is shown. Computing system 100 may be part of a flight control system of the aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), a sensor, etc. The I/O device(s) 108 may be configured to provide an interface to allow a user to interact with the system 100.

As shown, the processor 106 may be coupled to a number 'n' of databases, 110-1, 110-2, . . . 110-n. The databases 110 may be used to store data, such as data obtained from one or more sensors (e.g., vibration, speed, and torque sensors). In some embodiments, the data may pertain to one or more parameters associated with a drive shaft of an aircraft (e.g., aircraft 10).

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110.

In some embodiments, physics-based modeling may be used to assess the risk of failure due to, e.g., non-corrosion failure modes. Embodiments of this disclosure may be used to enhance detectability using existing mechanical diagnostic sensors with an emphasis on the detection and prediction of bolt-hole elongation and cracking and associated drivers.

In some embodiments, a conditioning monitoring capability is provided to detect disc coupling failure modes via vibration data. Any modeling necessary to assess the severity and likelihood of any detected faults may also be provided.

Figure 2:
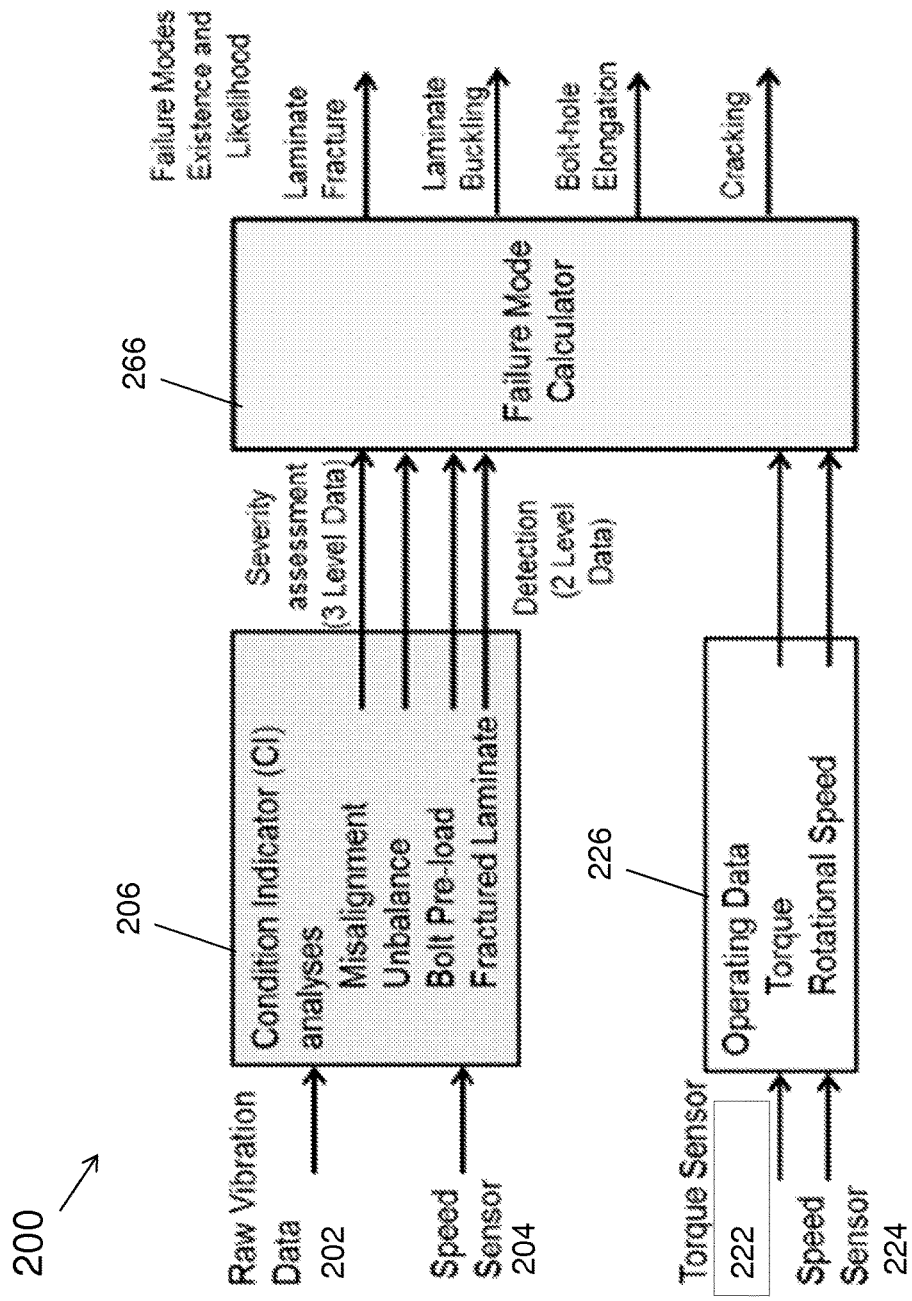
FIG. 2 is a block diagram of an exemplary system environment.

Referring to FIG. 2, a system architecture 200 is shown. Raw vibration data 202 and speed sensor data 204 may be provided to a condition indicator (CI) analyses processor, algorithm, or model 206. The model 206 may take into consideration one or more factors or modes, such as misalignment, unbalance, bolt pre-load and fractured laminate. The model 206 may output one or more levels of data. For example, so-called 3-level data may be used to provide a severity assessment (e.g., healthy, warning, severe). So-called 2-level data may be used for purposes of detection of a boolean condition (e.g., healthy/failed).

The system 200 may obtain torque data from a torque sensor 222 and speed data from a speed sensor 224 (which may correspond to, or be the same as, the data 204). The torque sensor data 222 and/or the speed sensor data 224 may be provided to an operating data model 226, which in turn may pass this data (or a processed or filtered version of it) to a failure mode calculator 266. The operating data model 226 may be used to indicate a type of operating mode an aircraft, or the system 200, is in.

The failure mode calculator 266 may generate one or more outputs indicative of a potential existence of one or more failure modes (e.g., laminate facture, laminate buckling, bolt-hole elongation, cracking, etc.) and associated likelihoods or probabilities thereof. In this manner, the system 200 may provide both quantitative and qualitative characteristics or values.

In some embodiments, physics-based modeling may be used to translate results of finite element and closed form analyses into models that may be executed in, e.g., near-real time to analyze vibration data (e.g., vibration data 202). Various analyses that may be performed are shown as part of Table 1 below:

TABLE 1

Model Analyses

| Analysis Area | Method | Type of Results | How Used |
|---|---|---|---|
| Unbalance | Closed Form (formulas, equations) | Force due to specified unbalance | Coupling loads |
| Tolerances | Closed Form (formulas, equations) | Bolt/Bolt-hole min and max tolerance conditions | Bolt-hole elongation |
| Lamination Stiffness as a function of bolt pre-load | Non-linear Finite Element Analysis (FFA) | Equivalent bending stiffness of lamination pack | Critical Speeds |
| Critical Speed | FEA | Natural Frequencies (critical speeds) of drive shaft assembly | Critical Speeds |
| Friction | Closed Form (formulas, equations) | Available friction to transmit torque | Bolt-hole elongation |
| Lamination Stresses | Non linear FEA | Stresses at edge of spherical washer due to misalignment | Laminate Crack propagation |
| Coupling Assembly Stresses | Non-linear FEA | Stresses in Driven Flange and End Cap due to misalignment | Crack initiation |

Turning now to FIG. 3, a flow chart of an exemplary method 300 is shown. The method 300 may be executed by one or more systems, components, or devices, such as those described herein (e.g., the system 100 and/or the system 200). The method 300 may be used to perform vibration diagnostics or analyses.

In block 302, vibration signals may be sampled. The sampling may occur periodically or in accordance with a schedule or routine. The sampling may occur during system operation.

In block 304, drive shaft (rotational) speed and torque (if available) may be sampled.

In block 306, the data samples of blocks 302 and 304 may be time-stamped to allow them to be compared with each other and compared against other system data.

In block 308, the vibration signals may be segmented into multiple segments representing data from one revolution of the shaft based on the nominal shaft speed.

In block 310, each of the vibration signal segments may be resampled from constant time based sampling to constant angular based sampling.

In block 312, averaging may be performed over one or more of the segments.

In block 314, the averaged time domain signals may be converted to the frequency domain.

In block 316, various shaft order based features may be extracted from the frequency domain signal. The features may correspond to the magnitudes of the frequency domain signal at specified frequencies representing integer multiples of the shaft speed ranging from, e.g., one to forty.

In block 318, the extracted features may be compared to thresholds established from data acquired for healthy drive shafts. Each feature may be assigned a value based on whether the feature is within expected bounds. As an example, a value of '0' may correspond to the feature being within a tolerance limit, and may coincide with a nominal or low-level risk. A value of '1' may correspond to the feature being outside of a warning limit, and may coincide with moderate risk. A value of '2' may correspond to the feature being outside of an alarm limit, and may coincide with severe risk.

In block 320, combinations of the extracted features and indications of whether the features exceed the thresholds may be used to quantify the existence and severity of, e.g., unbalance misalignment, loss of bolt preload, coupling cracking, etc.

In block 322, diagnostic information (of block 320) may be provided to various models, such as those described herein. The models may be used to schedule one or more inspections or maintenance activities.

The method 300 is illustrative. In some embodiments, one or more of the blocks or operations (or a portion thereof) may be optional. In some embodiments, additional blocks or operations not shown may be included. In some embodiments, the blocks or operations may execute in an order or sequence that is different from what is shown in FIG. 3.

As described herein, embodiments of the disclosure may use operational history, vibration analysis, and physics-based models to detect failure mode drivers and predict the presence of different faults, including bolt-hole elongation and/or cracking, at the end of a specified inspection interval. Enhanced vibration analysis may be used to quantify the drivers of coupling degradation. Values of these drivers may serve as a bolt-hole load estimation model; along with the available drive shaft load measurements or predictions. Once the bolt-hole loads are quantified, finite element models may be used to quantify the stresses induced in the bolt holes, and damage accumulation models may be used to predict the likelihood of the presence of bolt-hole elongation and or cracks.

As described herein, embodiments of the disclosure may be used to provide both a condition monitoring capability to detect disc coupling failure modes via vibration data and the modeling necessary to assess the severity and likelihood of any detected faults. With an understanding of both the current and future health of the disc coupling, a maintenance philosophy or program may be altered from scheduled or reactive-based maintenance to maintenance driven by condition-based indicators. Aspects of this disclosure may be used to reduce the number or quantity of unanticipated failures, and may be useful in applications where failure is not safety-critical and maintenance is primarily reactive. Safety may be improved while optimizing maintenance and increasing the uptime of an asset (e.g., an aircraft).

Aspects of this disclosure may be geared to, or modified, to account for various types of aircraft and platforms. In some embodiments, operational or safety requirements may be used to adjust thresholds associated with one or more failure modes.

Aspects of this disclosure may be used in connection with drivetrains. For example, aspects of this disclosure may be applied to low speed shafts in a tail section and/or high speed shaft disc couplings.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method applied to one or more components of a drive shaft of an aircraft, the method comprising:
   obtaining data based on samples of a vibration signal;
   processing, by at least one processor, the data to obtain a qualitative and quantitative assessment of a health of the one or more components based on an application of the data to at least one model, wherein processing the data further comprises segmenting the vibration signal into a plurality of segments representative of a revolution of the drive shaft based on a nominal speed of the drive shaft as part of processing the data, resampling the vibration signal segments from constant time based sampling to constant angular based sampling, and averaging the resampled segments as part of processing the data; and
   outputting the assessment.

2. The method of claim 1, wherein the obtained data is based on samples of drive shaft speed and torque.

3. The method of claim 1, further comprising:
   converting the averaged resampled segments from a time domain signal representation to a frequency domain signal representation as part of processing the data.

4. The method of claim 3, further comprising:
   extracting magnitudes from the frequency domain signal representation at frequencies representing integer multiples of a speed of the drive shaft as part of processing the data.

5. The method of claim 4, further comprising:
   comparing the magnitudes to thresholds established for a healthy drive shaft; and
   scheduling at least one of an inspection and a maintenance activity when the comparison indicates that the drive shaft is unhealthy.

6. The method of claim 1, wherein the health of the one or more components pertains to at least one of: coupling cracking, disc buckling, bolt-hole elongation, corrosion, damage, security, wear, lamination spread, and loss of bolt preload in disc-style couplings.

7. An apparatus for use in connection with an aircraft, the apparatus comprising:
   at least one processor; and
   memory having instructions stored thereon that, when executed by the at least one processor, cause the apparatus to:
      obtain data based on samples of a vibration signal;
      process the data to obtain a qualitative and quantitative assessment of a health of one or more components of a drive shaft of the aircraft based on an application of the data to at least one model, wherein processing the data includes segmenting the vibration signal into a plurality of segments representative of a revolution of the drive shaft based on a nominal speed of the drive shaft as part of processing the data and averaging the segments as part of processing the data; and
      output the assessment.

8. The apparatus of claim 7, wherein the instructions, when executed by the at least one processor, cause the apparatus to:
   convert the averaged segments from a time domain signal representation to a frequency domain signal representation as part of processing the data.

9. The apparatus of claim 8, wherein the instructions, when executed by the at least one processor, cause the apparatus to:
   extract magnitudes from the frequency domain signal representation at frequencies representing integer multiples of a speed of the drive shaft as part of processing the data.

10. The apparatus of claim 9, wherein the instructions, when executed by the at least one processor, cause the apparatus to:
    compare the magnitudes to thresholds established for a healthy drive shaft; and
    schedule at least one of an inspection and a maintenance activity when the comparison indicates that the drive shaft is unhealthy.

11. An aircraft comprising:
    a drive shaft comprising a plurality of components;
    a plurality of sensors configured to measure vibration associated with the aircraft;
    a control computer configured to:
       sample measurements from the sensors to obtain data;
       process the data to obtain a qualitative and quantitative assessment of a health of at least one of the components based on an application of the data to at least one model, wherein processing the data includes segmenting the vibration signal into a plurality of segments representative of a revolution of the drive shaft based on a nominal speed of the drive shaft as part of processing the data and averaging the segments as part of processing the data; and
       output the assessment.

12. The aircraft of claim 11, wherein the control computer is configured to:
    time-stamp the sampled measurements,
    wherein the processing of the data is based on a comparison of sampled measurements at different times based on the time-stamps.

13. The aircraft of claim 11, wherein the health of the at least one component pertains to at least one of: unbalance, misalignment, loss of bolt preload, and coupling cracking.

\* \* \* \* \*